(12) United States Patent
Bradley (10) Patent No.: US 6,948,001 B1
(45) Date of Patent: Sep. 20, 2005

(54) MODULAR SOFTWARE METHOD FOR INDEPENDENT STORAGE NODES

(75) Inventor: Mark W. Bradley, Boulder, CO (US)

(73) Assignee: Radiant Data Corporation, Niwot, CO (US)

( * ) Notice: Subject to any disclaimer, the term of this patent is extended or adjusted under 35 U.S.C. 154(b) by 655 days.

(21) Appl. No.: 09/705,421

(22) Filed: Nov. 2, 2000

(51) Int. Cl.[7] .................. G06F 15/16; G06F 17/30; G06F 13/12
(52) U.S. Cl. .................. 709/246; 707/4; 710/65
(58) Field of Search .................. 370/466; 709/230, 709/227, 246, 217; 707/204, 4; 711/6; 719/312, 719/324; 718/100; 717/100; 713/100; 710/260, 710/65

(56) References Cited

U.S. PATENT DOCUMENTS

| | | | |
|---|---|---|---|
| 5,812,843 A * | 9/1998 | Yamazaki et al. | 718/100 |
| 6,009,476 A * | 12/1999 | Flory et al. | 719/324 |
| 6,094,684 A * | 7/2000 | Pallmann | 709/227 |
| 6,192,418 B1 * | 2/2001 | Hale et al. | 719/312 |
| 6,400,730 B1 * | 6/2002 | Latif et al. | 370/466 |
| 6,484,309 B2 * | 11/2002 | Nowlin et al. | 717/100 |
| 6,493,761 B1 * | 12/2002 | Baker et al. | 709/230 |
| 6,615,303 B1 * | 9/2003 | Endo et al. | 710/260 |
| 6,640,278 B1 * | 10/2003 | Nolan et al. | 711/16 |
| 6,665,689 B2 * | 12/2003 | Muhlestein | 707/204 |
| 6,665,724 B2 * | 12/2003 | Lawrence | 709/230 |
| 6,763,458 B1 * | 7/2004 | Watanabe et al. | 713/100 |
| 6,795,824 B1 * | 9/2004 | Bradley | 707/10 |
| 6,871,245 B2 * | 3/2005 | Bradley | 710/65 |

OTHER PUBLICATIONS

Andrew S. Tanenbaum "Structured Computer Organization", 1990, Prentice-hall, Third Edition, p. 11.*

* cited by examiner

*Primary Examiner*—William A. Cuchlinski, Jr.
*Assistant Examiner*—Michael Delgado
(74) *Attorney, Agent, or Firm*—Martine Penilla & Gencarella, LLP (57) ABSTRACT

An independent storage node is disclosed that includes a processor and transport hardware in communication with the processor that is capable of communicating data via a transport connection. Executing on the processor is modular storage software that comprises a plurality of software modules and a module interface. The module interface allows dynamic binding of the software modules and is capable of executing on a plurality of processor types by using particular software modules related to a specific processor type.

11 Claims, 12 Drawing Sheets

MODULAR SOFTWARE METHOD FOR INDEPENDENT STORAGE NODES

CROSS REFERENCE TO RELATED APPLICATIONS

This application is related to the following applications: (1) U.S. Pat. No. 6,687,716, filed Sep. 13, 2000, and entitled "File Consistency Protocols and Methods for Carrying out the Protocols"; (2) U.S. Pat. No. 6,871,245 filed on the same day as the instant application, and entitled "Dynamic Flat File Systems and Methods for Using the Same"; (3) U.S. Pat. No. 6,665,780, filed Oct. 6, 2000, and entitled "N-Way Data Mirroring System and Methods for Using The Same"; and (4) U.S. Pat. No. 6,795,824, filed Oct. 31, 2000, and entitled "Independent Storage Architecture." Each of these related application is incorporated herein be reference.

BACKGROUND OF THE INVENTION

1. Field of the Invention

This invention relates generally to computer storage, and more particularly to computer storage systems and methods that are independent of microprocessor architecture, microprocessor type, transport hardware or I/O device controller type that comprise an independent storage node.

2. Description of the Related Art

Today, more and more reliance is being placed on computers to create, edit, modify, and store important documents. With this reliance, comes the need for increased versatility in the ability to store and retrieve data. There are several techniques available today for facilitating computer storage, and as will be seen, more versatility in computer information storage is needed.

Figure 1A:
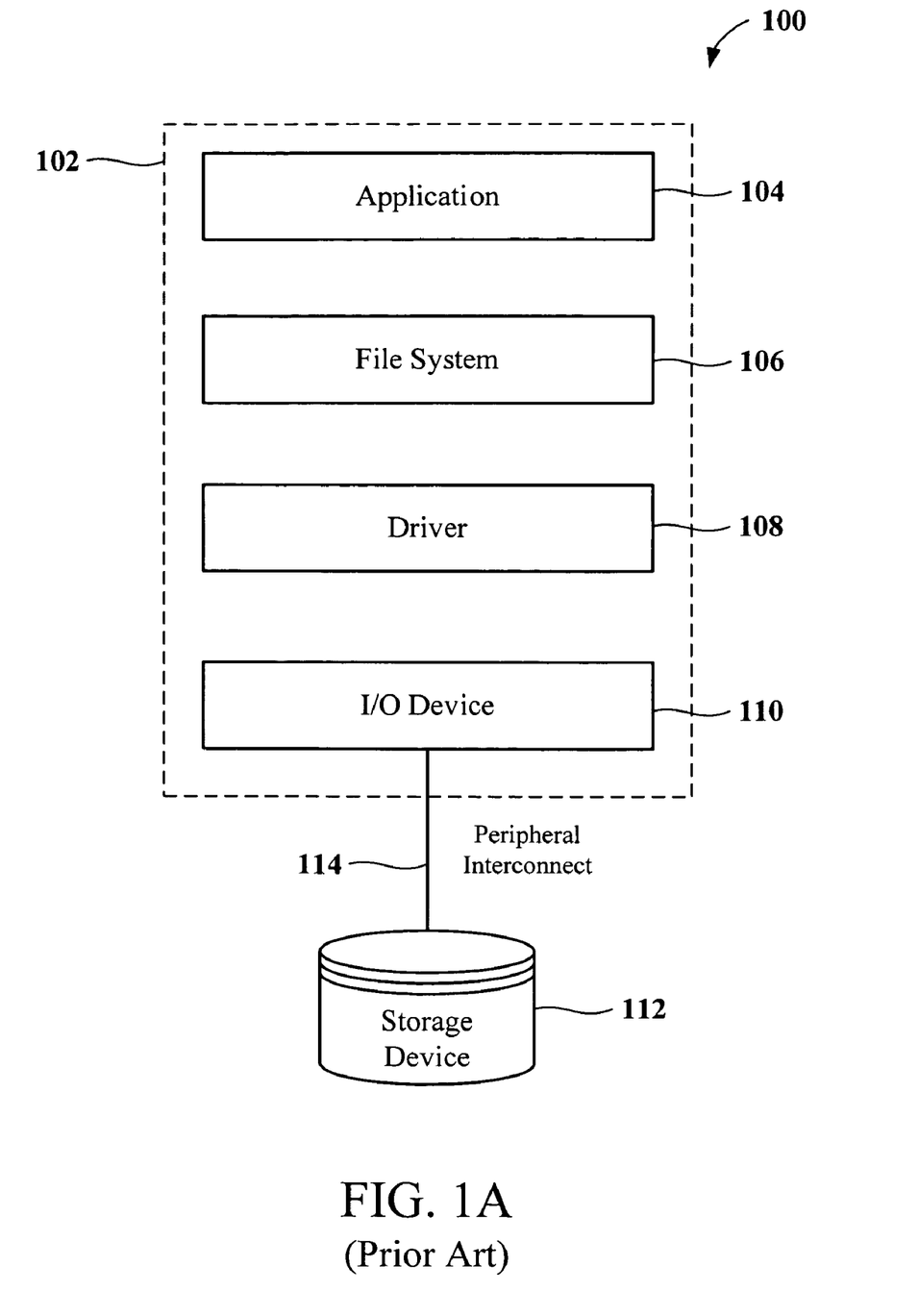
FIG. 1A is a block diagram showing a conventional local storage system.

FIG. 1A is a block diagram showing a conventional local storage system 100. The local storage system 100 includes a user computer 102 and a storage device 112 coupled to the user computer 102 via a peripheral interconnect 114. The user computer 102 has executed thereon an application 104, an operating system (O/S) having a local file system 106, a driver 108 for an input/output (I/O) device 110 that controls the storage device(s) 112.

To store and retrieve data for the storage device 112, the application 104 typically transmits a request to the local file system 106, which in turn passes the file system request to the device driver 108. The device driver 108 converts the file system request into a block-level I/O request that is then passed from I/O device 110 over the peripheral interconnect 114 to the storage device 112.

The I/O request then completes and the completion result is passed back up through the I/O device 110, driver 108, and local file system 106. The data is either placed into system memory, for a disk READ operation, or placed on the storage device 112 for a disk WRITE command.

Figure 1B:
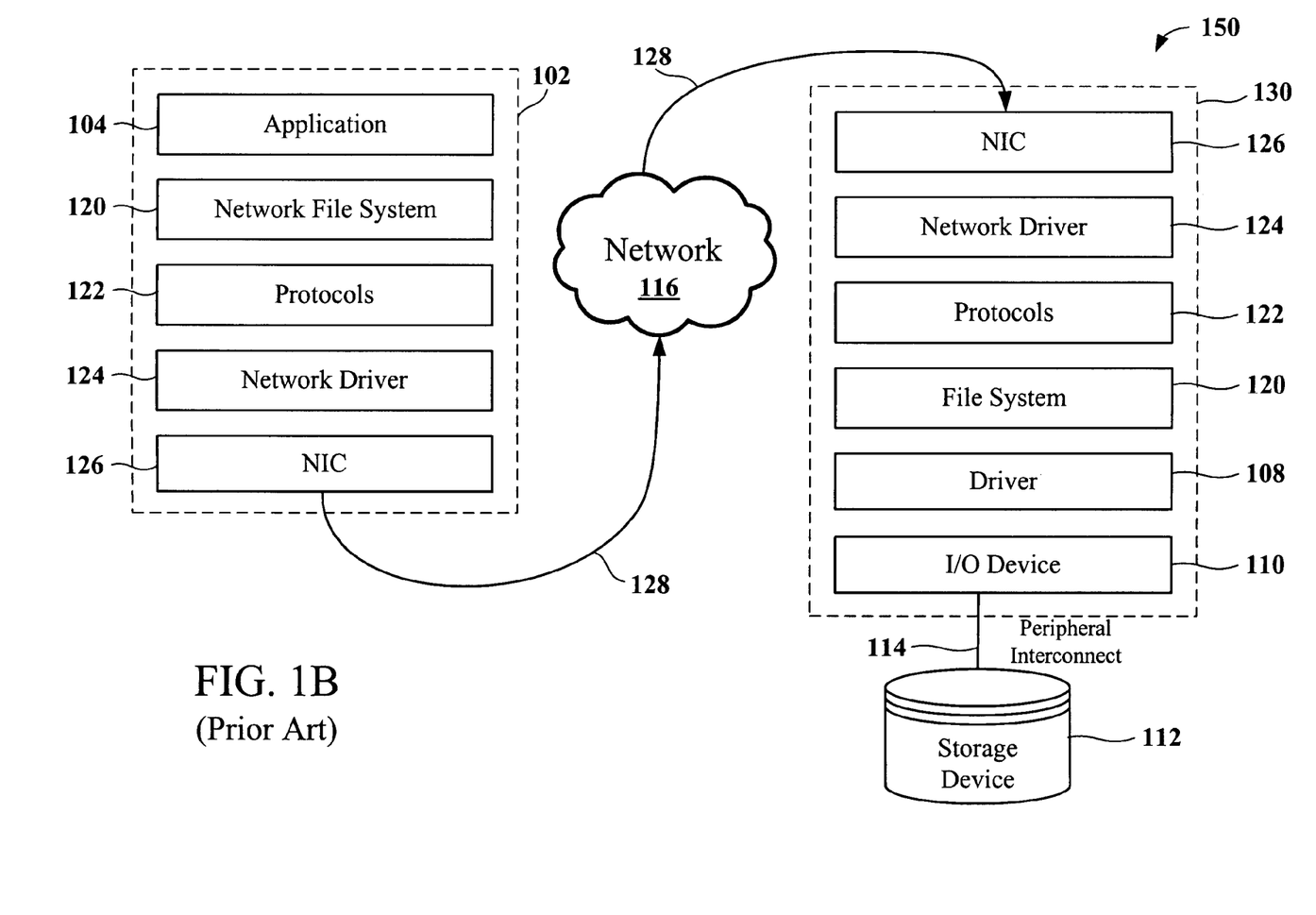
FIG. 1B is a block diagram showing a prior art network file storage system.

To provide increased flexibility the network file system (NFS) has been used to store data remotely from a user computer. FIG. 1B is a block diagram showing a prior art network file system 150. The network file system 150 includes a user computer 102 and a storage computer 130 coupled to the user computer 102 via a network 116. Using the conventional NFS 150 a user can store data on a remote server 130 that is executing the same or a compatible O/S as the user computer 102.

To accomplish remote NFS storage, the user computer 102 includes an application 104, a network file system 120, protocols 122, a network driver 124, and a network interface card (NIC) 126 coupled to the network 116 via transport 128. The storage computer 130 includes a corresponding NIC 126, network driver 124, protocols 122, and file system 120. In addition, the server 130 includes a device driver 108, and an I/O device 110 coupled to a storage device 112 via a peripheral interconnect 114.

In the conventional NFS 150, the network file system 120 replaces the local file system 106 of FIG. 1A, and is typically layered on TCP/IP or UDP/IP protocols 112. To store and retrieve data using NFS 150, the application 104 typically transmits a file system request to the network file system 120, through the protocol stacks 122 to the network driver 124. The network driver 124 then transmits the request from the NIC 126 of the user computer 102 to the NIC 126 of the storage computer 130 via the network 116 and transport connections 128.

When received by the NIC 126 on the storage computer 130, the request is passed through the network driver 124 and protocol stacks to the file system 120, which in turn passes the file system request to the device driver 108 of the storage computer 130. The device driver 108 then converts the file system request into a block-level I/O request that is passed from I/O device 110 to the storage device 112 via the peripheral interconnect 114.

When the I/O request completes, the result is passed back up through the I/O software layers of both the storage computer 130 and the user computer 102 using the network 116. The data is then either placed into the memory of the user computer for a READ operation, or placed on the storage device 112 for a WRITE command.

A problem with the conventional network file system 150 is that generally both the user computer 102 and the storage computer 130 need to execute the same O/S and file system 120. Thus, if the user computer 102 is executing on WINDOWS NT, the storage computer 130 also needs to execute WINDOWS NT for the network file storage system 150 to operate properly.

Thus, if the storage computer 130 is used with a plurality of user computers 102, all the user computers 102 generally must execute the same O/S and file system 120 as is executed on the storage computer 130. However, it is not always desirable to use a particular O/S for a particular application. Hence, different users often operate under different O/S's, and therefore may not be able to share the storage system 150 of a remote computer in this way.

Moreover, in both the convention local storage system 100 and NFS 150, the software controlling the storage aspects of the systems generally must be specifically written to support the specific hardware comprising the system, including the microprocessor architecture, which includes the endian-ness, internal design, and internal bit architecture of the processor. This limitation causes problems when hardware within a conventional storage system is changed, since the original software may no longer execute properly on the system. Thus, whenever new devices, processors, or other system hardware is changed, the system software of a conventional local storage system 100 or NFS 150 generally must be completely rewritten to function with the new system hardware.

In view of the forgoing, there is a need for a storage system that is capable of operation independent of the operating systems' limitations and which allows the storage not to be hosted by another computer system. The storage system should be capable of storing data remotely and capable of operating independently of any particular consumer computers' O/S. Further, the storage system should be capable of operating with reduced user configuration or networking knowledge, such that the user generally does not need to learn how to use a configure complex networked file and storage systems. In order to provide this functionality, storage nodes should be configurable to support many differing transport drivers, transport protocols, I/O device drivers and varying hardware configurations.

SUMMARY OF THE INVENTION

Broadly speaking, the present invention fills the needs described above by providing a storage system capable of providing data storage independent of a consumer computer architecture, independent of the transport, and independent of various network operating system environments. To this end, the storage nodes of the system are preferably embodied in a hardware component, or assembly, and a software component comprising a number of software modules providing the aforementioned functionality. The software modules themselves include well defined messaging interfaces that enable the modules to be combined, added to, or removed in order to provide the necessary functionality in the storage node. Further, the software is preferably capable of running on any microprocessor, regardless of the microprocessor architecture without modification of the source code.

In one embodiment, a system for modular storage software is disclosed. The system includes a module to module interface that is capable of receiving a message, which is configured in a first format, and translating the received message into a second format. In communication with the module interface is a first software module that is capable of sending messages configured in the first format to the module interface. Further, a second software module is in communication with the module interface. The second software module is capable of communicating messages configured in the second format to the module interface. In this manner, the first software module is capable of communicating with the second software module via the module interface to facilitate data storage and retrieval.

In another embodiment, an independent storage node is disclosed that includes a processor and transport hardware in communication with the processor that is capable of communicating data via a transport connection. Executing on the processor is modular storage software that comprises a plurality of software modules and a module interface. The module interface allows dynamic binding of the software modules and is capable of executing on a plurality of processor types by using particular software modules related to a specific processor type.

Advantageously, embodiments of the present invention can provide platform-independent storage for consumer computers, regardless of underlying hardware, software, including the operating system, protocols or physical transport. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an independent storage system in a (distributed) computer environment. The present invention provides data storage independent from the particular operating systems executing on associated user computers. To this end, the storage nodes of the system are preferably embodied in a hardware component and a software component comprising a number of software modules, which include well defined messaging interfaces that enable the modules to be combined, added to, or removed. Using these software modules, embodiments of the present invention are capable of running on any microprocessor, regardless of the microprocessor architecture without modification of the source code.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2:
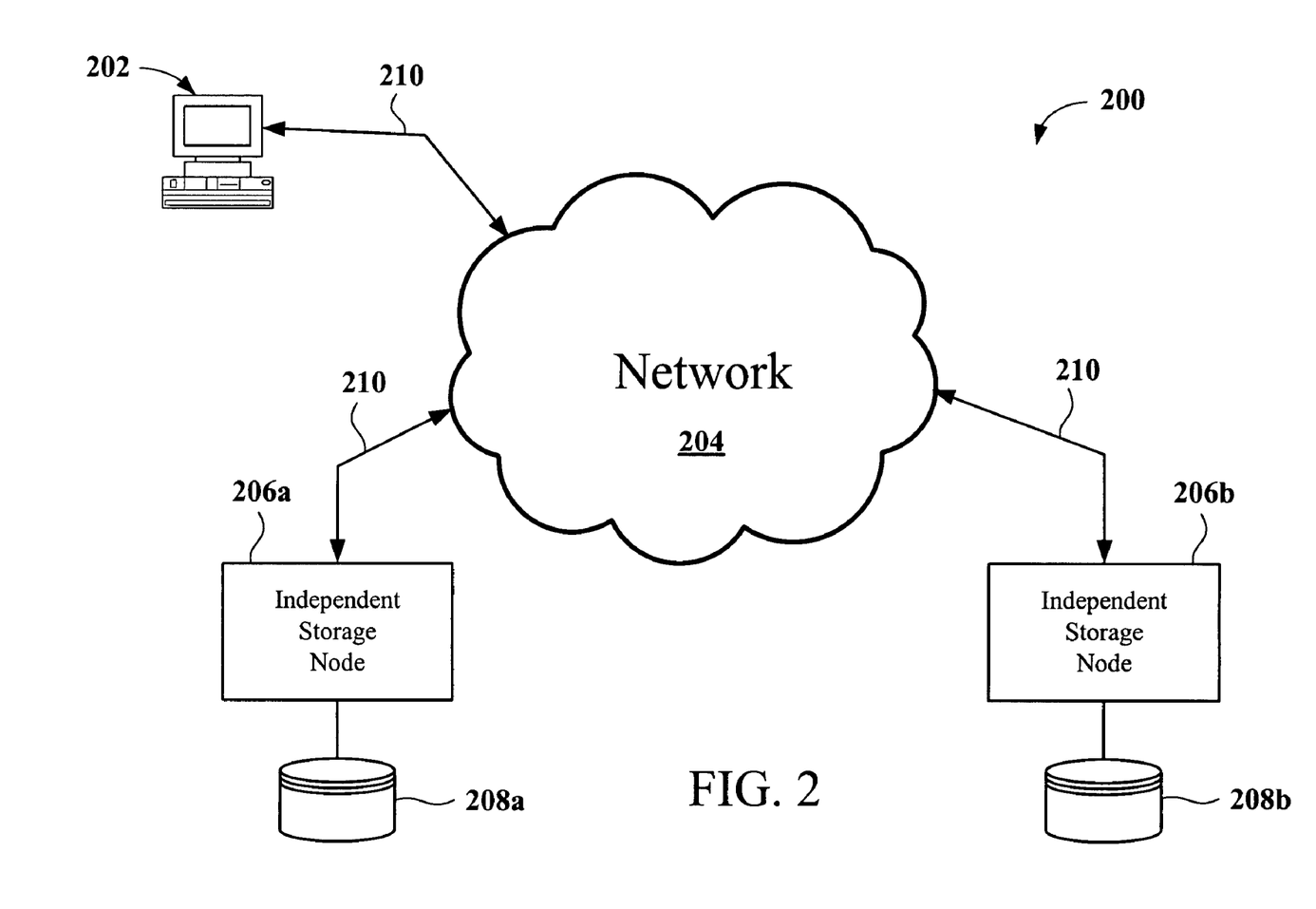
FIG. 2 is a high-level illustration of an independent storage system, in accordance with an embodiment of the present invention.

FIGS. 1A and 1B were described in terms of the prior art. FIG. 2 is a high-level illustration of an independent storage system 200, in accordance with an embodiment of the present invention. The independent storage system 200 includes a consumer computer 202 coupled to a network 204 via transport connection 210. Also included in the independent storage system 200 is a first and second independent storage node 206a and 206b, each coupled to the network 200 via an associated transport connection 210, and each coupled to an associated storage device 208a and 208b.

The network 204 can be any network or other transport capable of providing communication between computers, such LAN, or a WAN, such as the Internet, a bus, or wireless technology. The independent storage nodes 206a and 206b can be any type of node capable of receiving storage based commands over the network 204 and storing data to the associated storage device 208a and 208b. In one embodiment, the independent storage nodes 206a and 206b are nodes that include some intelligence, transport capability, I/O hardware capable of transmitting and receiving data via the transport connection 210 coupled the network 204, and software to perform the necessary file storage operations. The consumer computer 202 is typically a personal computer coupled to the network via a transport hardware, which a user uses to store and retrieve needed data.

The independent storage system 200 is capable of providing data storage to the consumer computer 202 remotely from the consumer computer 202 and independent of the particular operating system and file system executing on the consumer computer 202. In operation, a user utilizes the consumer computer 202 to run an application. When the user desires to store data, the user selects a destination for the data. The data is then transmitted from the consumer computer 202 though the transport connections 210 and network 204 to an independent storage node 206, such as independent storage node 206a, which then places the data on the associated storage device 208.

In one embodiment of the present invention, an application executing on the consumer computer 202 interacts with a storage device 208a of an independent storage node 206a as if the storage device 208a were local to the consumer computer 202. In this embodiment, the application executing on the consumer computer 202 has had the transport specifics used to access the storage device 208a, and thus interacts with the storage device 208a as a traditional local drive. In this manner, the user does not need to learn a new file system to utilize the independent storage system 200.

Moreover, the independent storage system 200 can be used by multiple consumer computers 202, regardless of the specific OS executing on each of the consumer computers 202. Each consumer computer 202 can execute a different OS and file system, yet still share information stored on an independent storage node 206. Thus, a first consumer computer 202 executing a WINDOWS NT OS and a second consumer computer 202 executing a UNIX OS can both share the same file data on the storage device 208a of the independent storage node 206a. The storage node, 206a, presents directory and file information in the format that is native to the consumer computers' operating and file systems.

Figure 3:
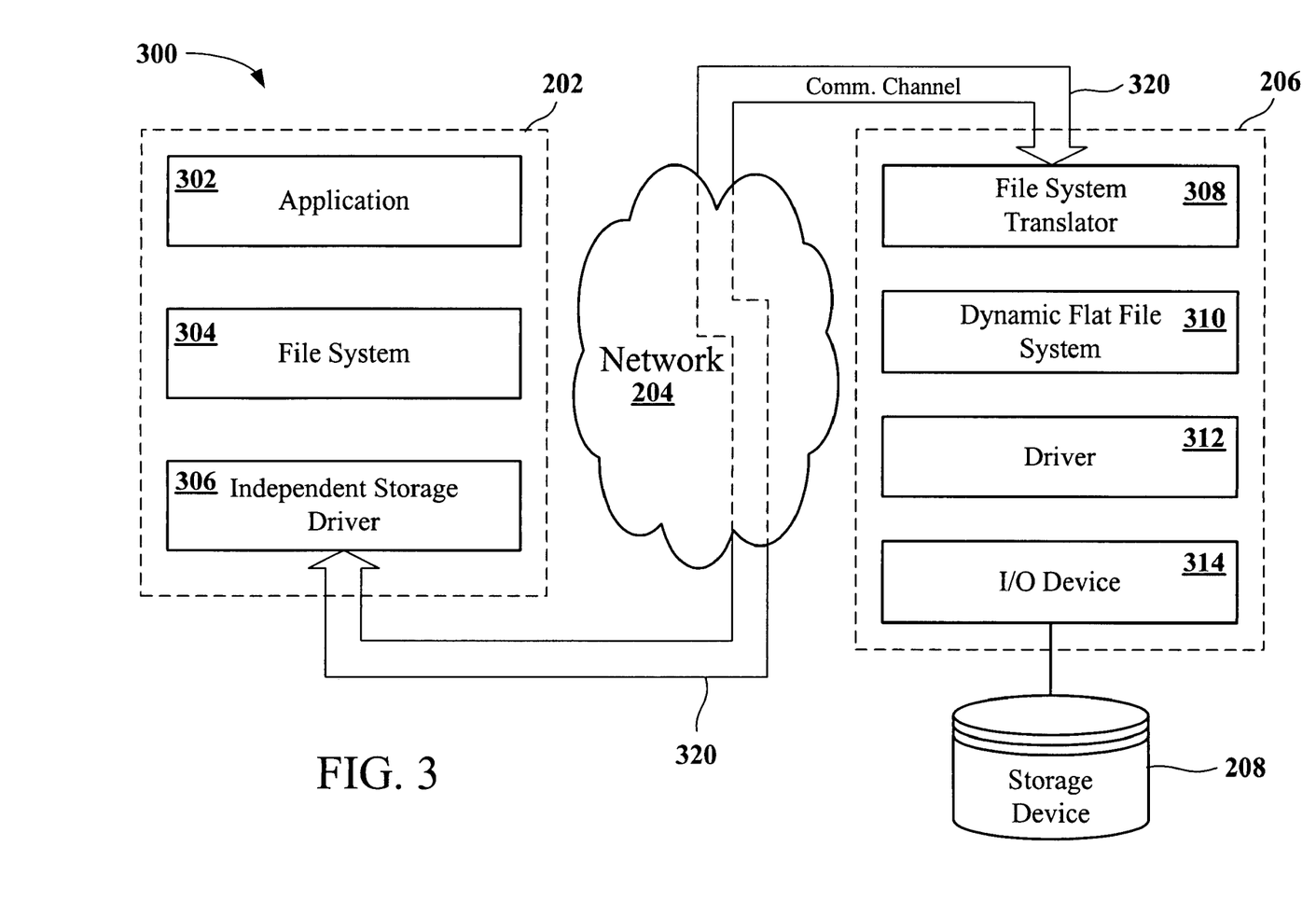
FIG. 3 is a block diagram showing a remote independent storage system, in accordance with an embodiment of the present invention.

FIG. 3 is a block diagram showing a remote independent storage system 300, in accordance with an embodiment of the present invention. The independent storage system 300 includes a consumer computer 202 and an independent storage node 206 coupled to the consumer computer 202 via a communication channel 320. As will be discussed in greater detail subsequently, the communication channel 320 instantiates communication between the consumer computer 202 and the independent storage node 206 through the transport 204, which may be a network, a bus, a wireless mechanism or other physical medium.

The consumer computer 202 includes an application 302, a file system 304, and an independent storage driver 306. The consumer computer 202 can be a personal computer, a server, a PDA or any other computing device having a processor, memory, and transport hardware for communicating over the transport 204. As will be discussed later with reference to FIGS. 7A and 7B, embodiments of the present invention can also be used locally within a single invention.

The independent storage node 206 includes a file system translator 308, a dynamic flat file system 310, a device driver 312, and an I/O device 314 coupled to a storage device 208. The independent storage node 206 can be any type of node capable of receiving storage based commands over the network 204 and storing data to the associated storage device 208. In one embodiment, the independent storage node 206 is a hardware configuration including a processor, memory, and transport hardware capable of transmitting and receiving data via the transport connection coupled the network 204.

It should be noted that the independent storage node 206 is not generally restricted by hardware. Because of the modularity of the embodiments of the present invention, the independent storage node 206 of the embodiments of the present invention can operate in conjunction with many different types of processor, such as DSP or i960 chips.

Embodiments of the present invention make the storage device 208 appear local to the consumer computer 202. Specifically, the independent storage driver 306 appears to the file system 304 of the consumer computer 202 as a typical device driver. Actually, the independent storage driver 306 functions to communicate file system request from the file system 304 to the independent storage node 206 via the communication channel 320 created expressly for this purpose. Hence, the independent storage driver 306 intercepts file system request from the file system 304, and transmits the request to the independent storage node 206. In this manner, embodiments of the present invention can make the storage device 208 appear as a local drive to the application 302 and file system 304 of the consumer computer 202.

In use, the application 302 transmits a file system request to the file system 304, which in turn passes the file system request to the independent storage driver 306. The independent storage driver 306 then transmits the file system request to the file system translator 308 of the independent storage node 206 via the communication channel 320.

The file system translator 308 configures the file system request into a second format based on the file system being executed on the independent storage node 206. For example, in the exemplary independent storage system 300 shown in FIG. 3, the file system translator 308 configures the file system request into a second format based on a flat file system and provides the translated file system request to the dynamic flat file system 310, which provides the request the device driver 312. The device driver 312 converts the translated file system request into a typical block-level I/O request that is then passed from the I/O device 314 to the storage device 208.

Although the examples discussed herein use a flat file system on the independent storage node, it should be borne in mind that any file system can be used. When using a file system other than the flat file system discussed herein, the file system translator 308 configures the file system request into a format based on the file system executing on the independent storage node 206. It should be noted that the translator may be a no-op in some cases.

The dynamic flat file system 310 shown in FIG. 3 is a file system constructed of volume-type, file-type and directory-type objects, structured as an array of objects. In one embodiment, objects are of the class "volume", "directory"

or of the class "file." Directory and volume objects reference other directories and files associated with the directories. All objects include an entry for their immediate parent object, which may be a node object, a volume object or a directory object.

The dynamic flat file system 310 incorporates object attributes that are a superset of other files system's attributes. In this manner, the dynamic flat file system 310 can represent files from other file systems whose attributes the dynamic flat file system 310 incorporates. As such, the dynamic flat file system 310 enables translation from the other file system formats to the dynamic flat file system 310 format, and vice versa.

The file system translator 308 translates from a disk-resident file system to a native file system format of the requester, and vice versa. To this end, the file system translator 308 combines a parsing and generation function with the ability to create file structures from more abstract attribute list, such as the attribute list of the dynamic flat file system 310. In use, the file system translator 308 reads the attributes for one file and maps those attributes to those that are native to the format that the consumer computer requires.

By using the file system translator 308 and the dynamic flat file system 310, the independent storage node 206 can perform file system request sent from the consumer computer 202 via the independent storage driver 306 regardless of the OS and file system executing on the consumer computer 202. Moreover, the independent storage driver 306 makes the storage device 208 appear local to the consumer computer 202.

Figure 4:
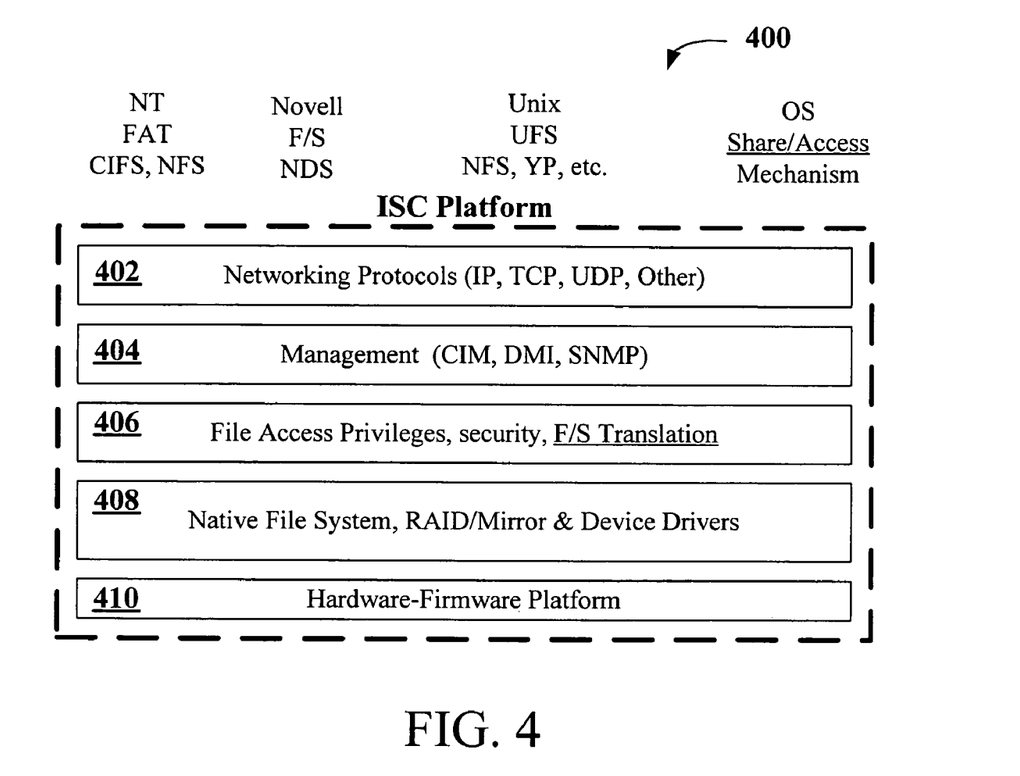
FIG. 4 is a block diagram showing an independent storage logical platform, in accordance with an embodiment of the present invention.

FIG. 4 is a block diagram showing an independent storage logical platform 400, in accordance with an embodiment of the present invention. The independent storage logical platform 400 include transport protocols module 402, a management function 404, file access privileges/security/file system translation module 406, a native file system/drivers module 408, and a hardware platform 410.

The independent storage logical platform 400 illustrates the modules used in embodiments of the present invention to make the independent storage system operate. The transport protocols module 402 and management module 404 are used to facilitate transfer of data and commands across the transport. In one embodiment, the transport protocols module 402 and management module 404 are part of the independent storage driver and reside on the consumer computer and the independent storage node. The privileges/security/file system translation module 406 is generally located on the independent storage node to facilitate data security and to translate file system request and data formats from the native file system of the independent storage node to the file system of the consumer computer.

The node-native file system module 408 typically resides on the independent storage node and facilitates access to the storage device driver. In one embodiment, the native file system module 408 includes the dynamic flat file system and associated device drivers. In addition, RAID and N-way Mirror software may be included in the native file system module 408. Finally, the hardware platform 410 represents the actual hardware that the above software modules are executed on.

Each module of the independent storage logical platform 400 includes a well-defined interface that allows dynamic binding of new modules. Further, the modular design allows for platform-specific modules to be interchanged with other modules to facilitate platform independence. For example, an independent storage logical platform 400 created to operate over an Ethernet network can be reconfigured to operate on a Fibre Channel network by replacing the networking protocols module and NIC driver 402 without having to recreate an entire independent storage logical platform 400. Similarly, processor specific modules may be interchanged to allow an independent storage logical platform to operate on any microprocessor, regardless of the microprocessor architecture without modification of the source code.

In one embodiment of the present invention, the independent storage logical platform 400 is capable of communicating with a particular O/S environment using a Uniform Driver Interface (UDI) standard. The UDI standard provides a standard driver environment to an O/S. Specifically, the UDI accepts UDI interfaces and translates the interfaces into interfaces specific to the particular O/S to which the UDI was implemented. The UDI also accepts interface messages from the particular O/S and translates these into UDI interfaces usable by UDI based drivers.

Thus, embodiments of the present invention can be used with any O/S that provides a UDI environment without source code changes. Since many operating systems may provide a UDI environment, embodiments of the present invention can be incorporated into many different operating systems and the computer or other hardware platforms on which the OS is implemented.

Figure 5:
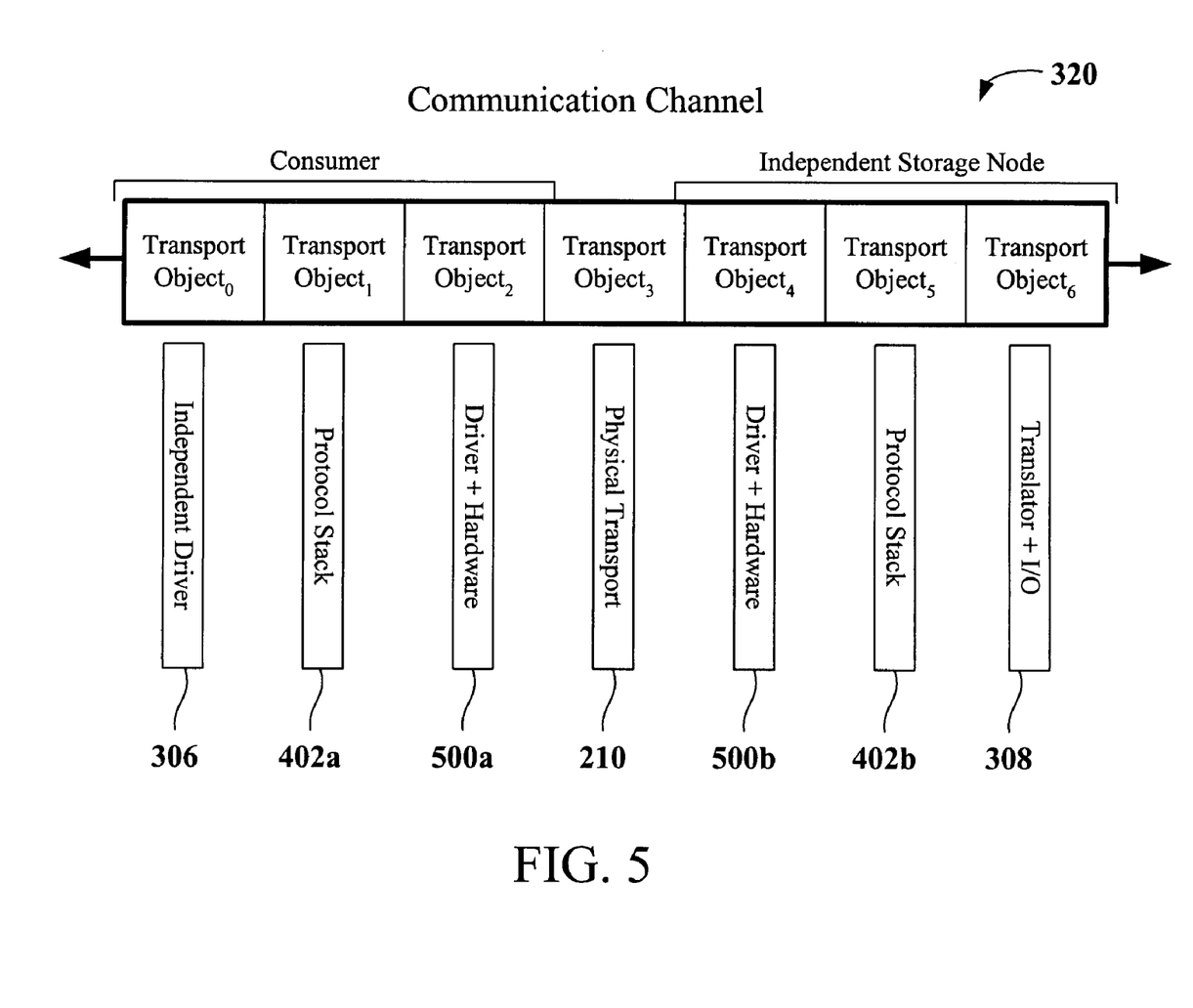
FIG. 5 is a block diagram showing a communication channel, in accordance with an embodiment of the present invention.

FIG. 5 is a block diagram showing a communication channel 320, in accordance with an embodiment of the present invention. The communication channel includes an independent storage driver 306, consumer protocol stacks 402a, consumer transport hardware related driver 500a, a transport 210, independent storage node transport hardware related driver 500b, independent storage node protocol stacks 402b, and a file system translator 308.

The consumer and node transport hardware 500a and 500b are NICs that allow communication over the transport 210, such as Ethernet or Fibre Channel NICs. The consumer and node device drivers 500a and 500b are device drivers that control the related transport hardware, such as Ethernet drivers or Fibre Channel drivers. The transport 210 is any medium over which data can be communicated using the transport hardware, such as a twisted pair wire or wireless connection. Preferably, the transport 210 supports a transport protocol, such as Internet Protocol (IP), or if the transport is a bus, such as PCI, a bus protocol may be used. The transport 210 can also include a network, such as the Internet. Hence, the consumer side transport hardware 500a can be in communication with the node transport hardware 500b via the Internet.

The communication channel 320 uses messaging and/or memory semantics and is a logical connection that is independent of the underlying physical transport 210 and the transport's low-level protocols. The communication channel 320 abstracts the transport driver and transport hardware, and thus presents the application (through an independent storage driver) and storage (through a file system translator and drivers) with a logical direct communication link between the two. That is, communication channel 320 is hidden from upper level applications using the independent storage driver, such that the upper level applications are unaware of the communication channel 320. As will be discussed later, the communication channel 320 may completely reside on a single machine and may not require a NIC, per se. It should be noted that the upper level applications interact with the storage device in essentially the same manner, whether the storage device is local or remote, since embodiments of the present invention make the storage device appear local to upper level applications.

Figure 6A:
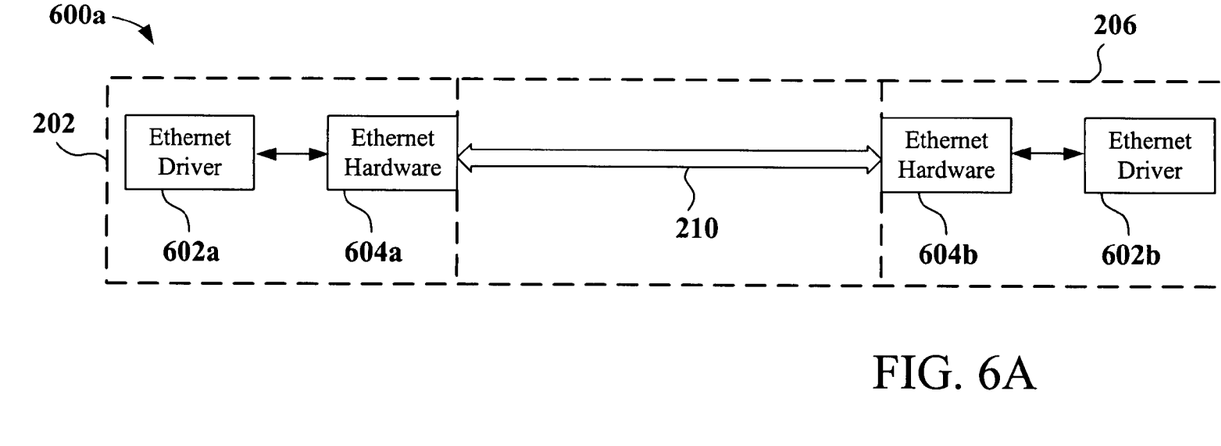
FIG. 6A is a block diagram showing an exemplary communication channel, in accordance with an embodiment of the present invention.
Figure 6B:
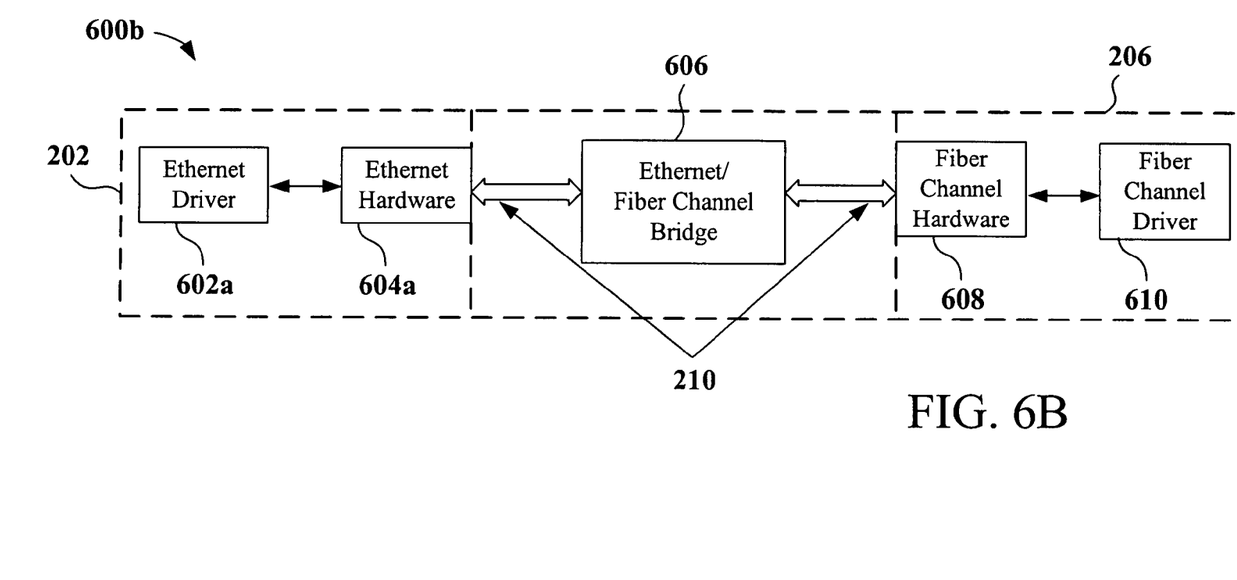
FIG. 6B is a block diagram showing another exemplary communication channel, in accordance with an embodiment of the present invention.

Detailed examples of the transport portions of two communication channels illustrating the transport hardware abstraction achievable using a communication channel are shown next with reference to FIGS. 6A and 6B. FIG. 6A is a block diagram showing an exemplary transport portion of a communication channel 600a, in accordance with an embodiment of the present invention. The exemplary transport portion of the communication channel 600a includes a first Ethernet driver 602a, first Ethernet hardware 604a, a transport 210, second Ethernet hardware 604b, and a second Ethernet driver 602b. In the exemplary transport portion of the communication channel 600a of FIG. 6A, the first Ethernet driver 602a and hardware 604a reside on the consumer computer 202. Similarly, the second Ethernet driver 602b and hardware 604b reside on the independent storage node 206 in the example of FIG. 6A.

Using the transport portion of the communication channel 600a, the consumer computer 202 can logically communicate with the independent storage node 206 using the first and second Ethernet drivers 602a and 602b. In this manner, the transport portion of the communication channel 600a forms part of an abstract logical connection between the consumer computer 202 and the independent storage node 206.

FIG. 6B is a block diagram showing a transport portion of another exemplary communication channel 600b, in accordance with an embodiment of the present invention. The exemplary transport portion of the communication channel 600b includes an Ethernet driver 602a, Ethernet hardware 604a, a transport 210, an Ethernet/Fibre Channel bridge 606, Fibre Channel hardware 608, and a Fibre Channel driver 610. The exemplary transport portion of the communication channel 600b illustrates one manner in which a communication channel 600b can be used as a logical communication mechanism that is independent of an underlying transport and its low-level protocols.

In use, data can travel from the Ethernet hardware 604a across the transport 210 to the Ethernet/Fibre Channel bridge 606. The Ethernet/Fibre Channel bridge 606 translates Ethernet commands into Fibre Channel commands, and vice versa, thus providing a mechanism to allow the Ethernet hardware 604a to communicate with the Fibre Channel hardware 608. The data then travels from the Ethernet/Fibre Channel bridge 606 to the Fibre Channel hardware 608 to the Fibre Channel driver 610. In this manner, the consumer computer 202 can communicate with the independent storage node 206 despite the difference in transport hardware of the two platforms. Thus, the transport portion of the communication channel 600b forms part of an abstract logical connection between the consumer computer 202 and the independent storage node 206.

Figure 7A:
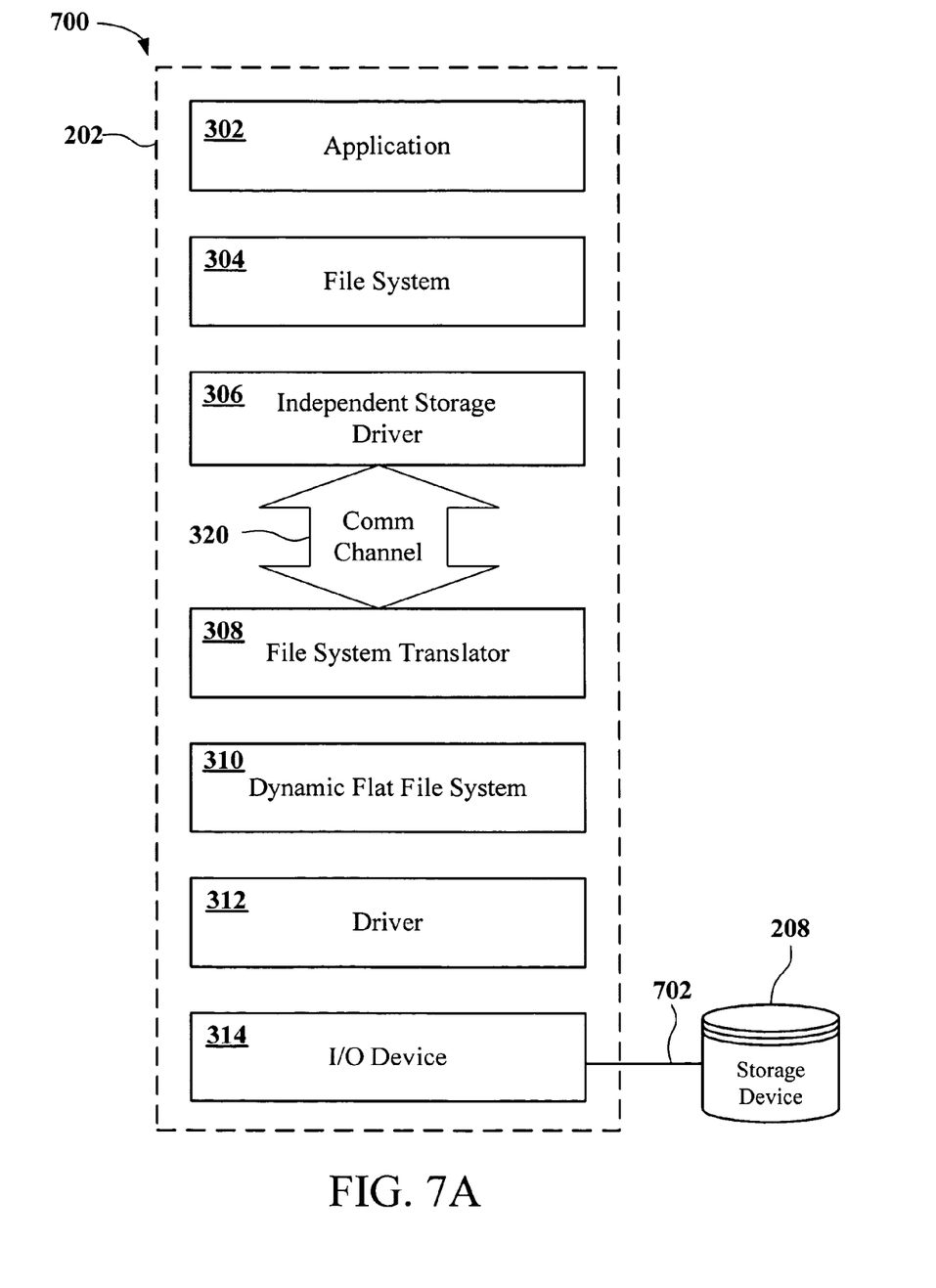
FIG. 7A is a block diagram showing an independent storage system supporting multiple file types, in accordance with an embodiment of the present invention.

As previously mentioned, the independent storage system of the embodiments of the present invention can be embodied on a single computer system. FIG. 7A is a block diagram showing a local independent storage system 700, in accordance with an embodiment of the present invention. The local independent storage system 700 includes a consumer computer 202 coupled to a storage device 208 via a peripheral interconnect 702.

The consumer computer 202 includes an application program 302, a file system 304, and independent storage driver 306, and a file system translator 308 in communication with the independent storage driver 306 via a communication channel 320. The consumer computer 202 further includes a dynamic flat file system 310, a device driver 312, and an I/O device 314 coupled to the storage device 208 via the peripheral interconnect 702.

In use, the application 302 transmits a file system request to the file system 304, which in turn passes the file system request to the independent storage driver 306. The independent storage driver 306 then transmits the file system request to the file system translator 308 via the communication channel 320.

Although the storage device is local to the consumer computer 202, the local independent storage system 700 still uses a communication channel 320 to transmit file system request to the file system translator, and vice versa. In this case, the transport could be a Peripheral Component Interconnect (PCI) bus. By using the communication channel 320 as a logical connection, the local independent storage system 700 can be more easily configured to work with a remote independent storage system, such as shown in FIG. 3, since the storage device 208 of both systems will appear local to the consumer computer 202. Thus, when the consumer computer 202 is accessing the storage device 208 of the local independent storage system 700, the communication channel of FIG. 7A could be used. When the consumer computer 202 is accessing the storage device 208 of the remote independent storage system, the communication channel of FIG. 3 could be used.

Referring back to FIG. 7A, the file system translator 308 can configure the file system request into a second format based on the file system being used to storage data on the storage device 208. For example, in the exemplary local independent storage system 700 shown in FIG. 7A, the file system translator 308 configures the file system request into a second format based on a flat file system and provides the translated file system request to the dynamic flat file system 310, which provides the request the device driver 312. The device driver 312 converts the translated file system request into a block-level I/O request that is then passed from the I/O device 314 to the storage device 208. In another embodiment, the dynamic flat file system 310 replaces the native file system 304 of the consumer computer 202. In this embodiment, the file system translator 308 could be excluded from the system 700.

Figure 7B:
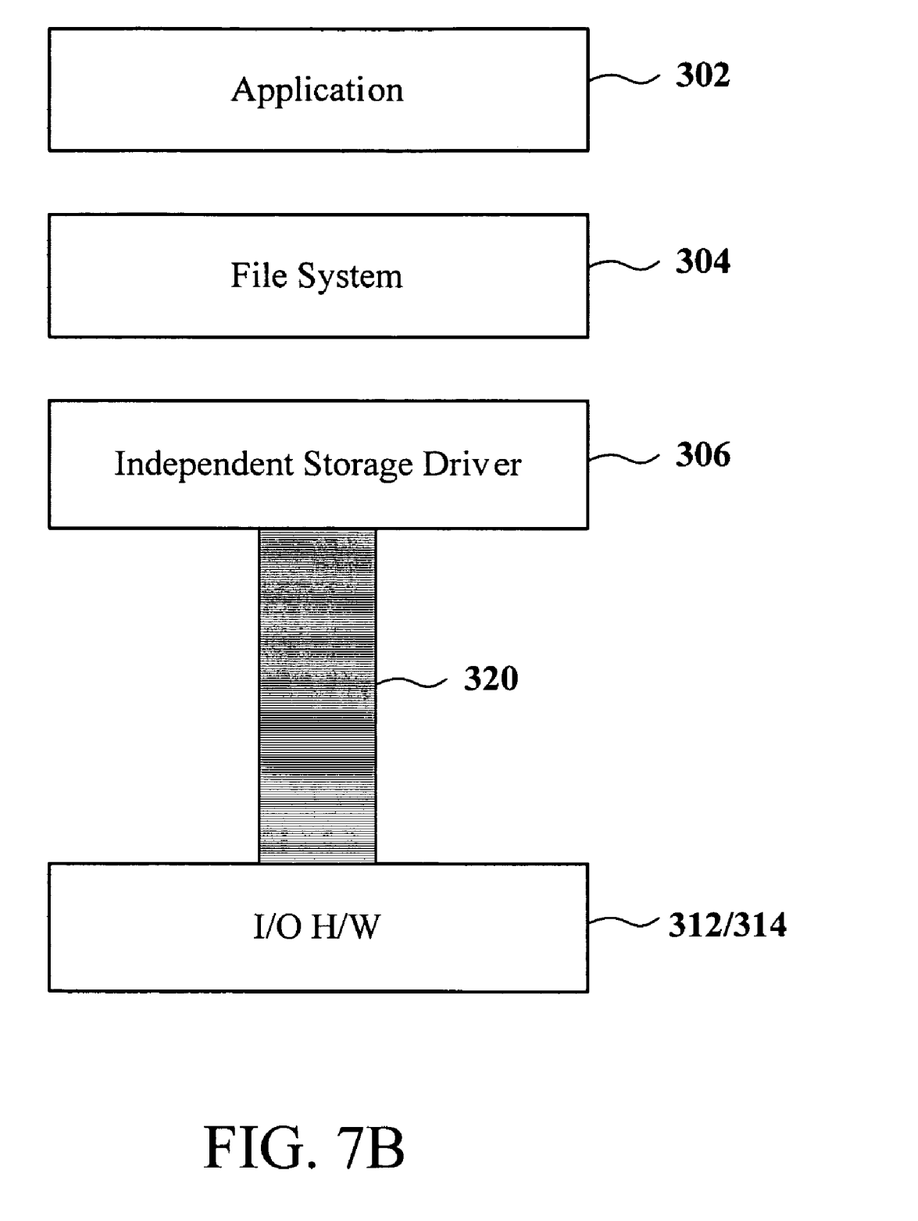
FIG. 7B is a block diagram showing an independent storage system supporting a single file type, in accordance with an embodiment of the present invention.

In some embodiments, the file system translation function 308 may not be required, because there may not be a need to support multiple file system types. In this case, the computer's 700 native file system 304 may be used and the communication channel 320 extends from the file system 306 to the storage device, as shown in FIG. 7B. The communication channel 320 in this embodiment is comprised of objects representing a device driver, a bus driver, a local I/O bus and bus interface logic.

Figure 8:
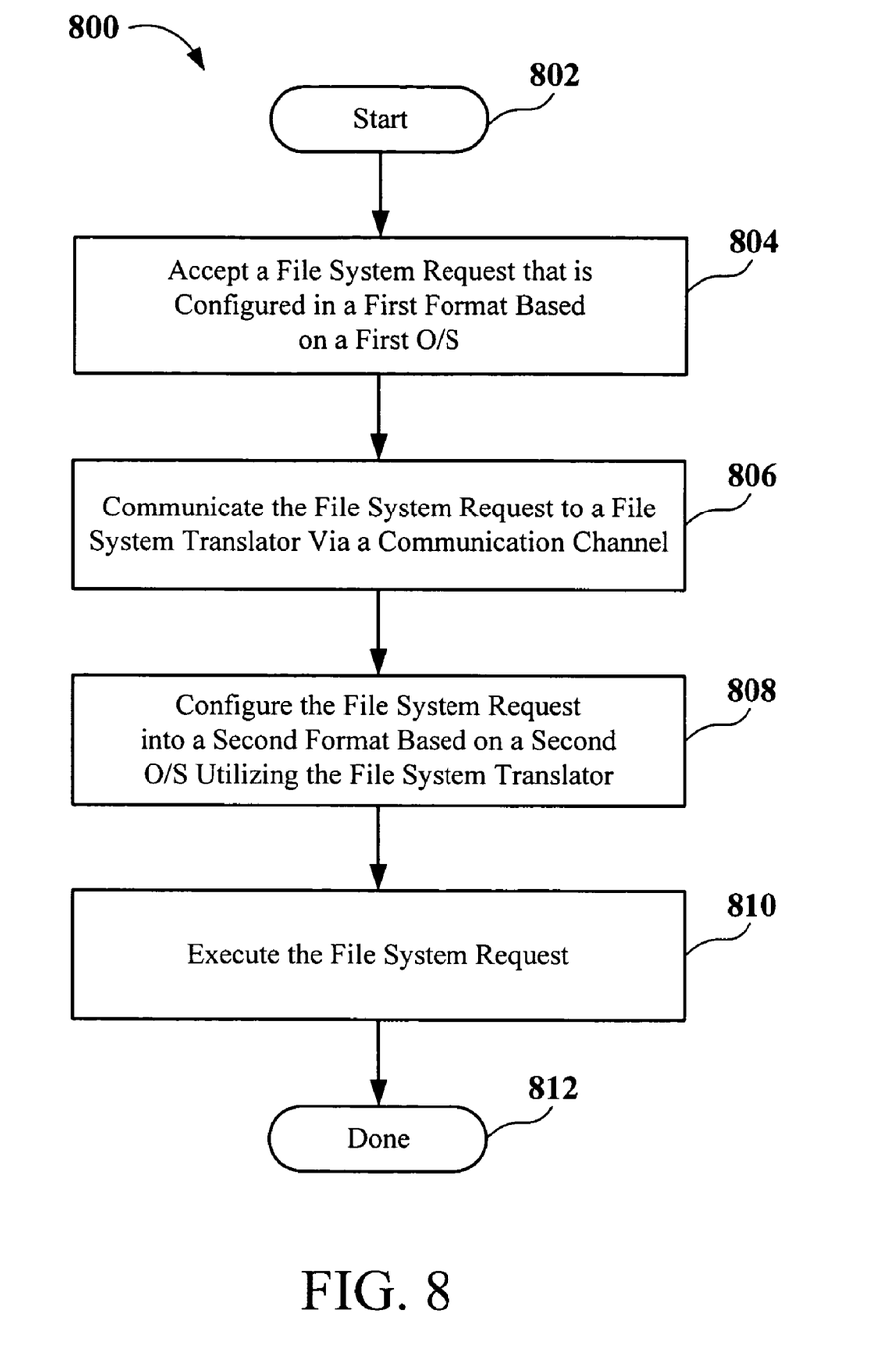
FIG. 8 is a flowchart showing a method for providing data storage independent of an underlying architecture, in accordance with an embodiment of the present invention.

FIG. 8 is a flowchart showing a method 800 for providing data storage independent of an underlying architecture, in accordance with an embodiment of the present invention. In a preprocess operation 802, preprocess operations are performed. Preprocess operations include mounting file systems and other preprocess operations that will be apparent to those skilled in the art.

In an intercepting operation 804, a file system request is intercepted. An application executing on the consumer computer generates a file system request, which is configured in the format of the O/S executing on the consumer computer. Once generated, the file system request is received by the independent storage driver, which appears to the file system of the consumer computer as a typical device driver. Actually, the independent storage driver functions to communicate file system request from the file system to the independent storage node via the communication channel created expressly for this purpose.

The file system request is communicated to a file system translator, in a communication operation 806. The communication channel uses driver-to-driver communication semantics (messages or memory operations) and is a logical connection that is independent of the underlying physical transport and the transports low-level protocols. The communication channel abstracts the transport driver and transport hardware, and thus presents the independent storage driver and file system translator with a logical direct communication link between the two. Further, the communication channel is hidden from upper level applications using the independent storage driver, such that the upper level applications are unaware of the communication channel. As discussed previously, the communication channel may completely reside on a single machine. It should be noted that the upper level applications interact with the storage device in essentially the same manner, whether the storage device is local or remote, since embodiments of the present invention make the storage device appear local to upper level applications.

In a translation operation 808, the file system translator configures the file system request into a second format based on the O/S executing on the independent storage node. For example, the file system translator could configure the file system request into a second format based on a flat file system and provide the translated file system request to a dynamic flat file system executing on the independent storage node.

The translated file system request is then executed, in operation 810. Having translated and provided the file system request to the file system operating on the independent storage node, the file system provides the request to the device driver. The device driver converts the translated file system request into a block-level I/O request that is then passed from the I/O device to execute the request in conjunction with the storage device.

Post process operations are then performed in operation 812. Post process operations include communication channel maintenance, synchronization of file system data, and other post process operations that will be apparent to those skilled in the art. Advantageously, embodiments of the present invention provide platform independent storage for consumer computers, regardless of underlying hardware, operating system, or physical transport.

Figure 9:
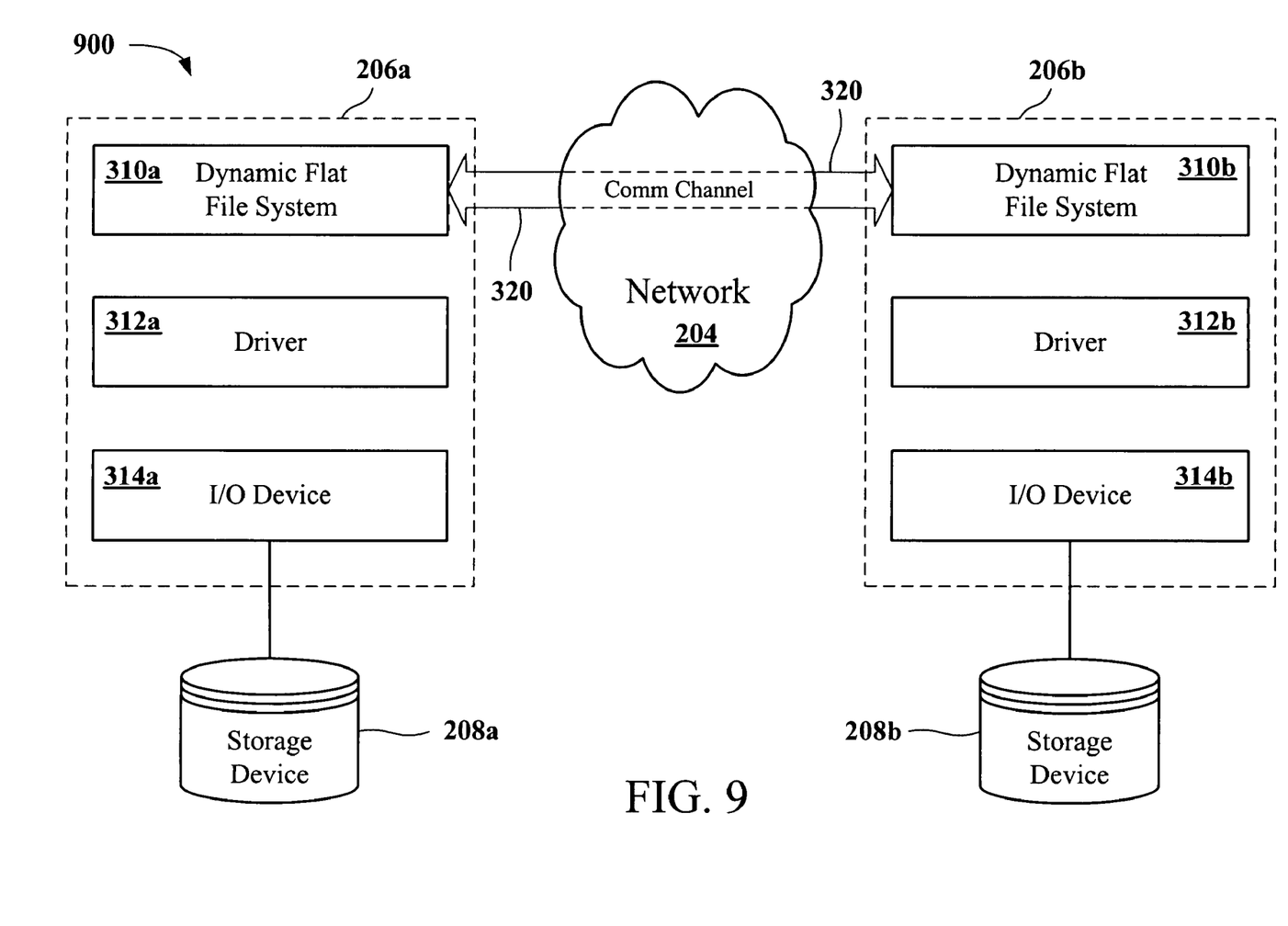
FIG. 9 is block diagram showing a system for independent storage-to-storage communication, in accordance with an embodiment of the present invention.

FIG. 9 is block diagram showing a system 900 for independent storage communication, in accordance with an embodiment of the present invention. The system 900 includes a first independent storage node 206a and a second independent storage node 206b in communication with first independent storage node 206a via a communication channel 320, which may be a network or other technologies. The first independent storage node includes a dynamic flat file system 310a, a device driver 312a, and an I/O device 314a coupled to a storage device 208a. The second independent storage node includes a dynamic flat file system 310b, a device driver 312b, and an I/O device 314b coupled to a storage device 208b.

As shown in FIG. 9, the first and second independent storage nodes 206a and 206b preferably utilize the dynamic flat file system 310. Using the communication channel 320, the independent storage nodes 206a and 206b can perform execute a file consistency protocol that enables file sharing, locking, and n-way mirroring. As a result, a given consumer computer may share data with other consumer computers both through the locking and sharing mechanisms provided and through the File system translator. The embodiments of the present invention enable heterogeneous file systems to share data in this manner by providing for the translation of the dynamic flat file system to essentially any other file system format.

Figure 10:
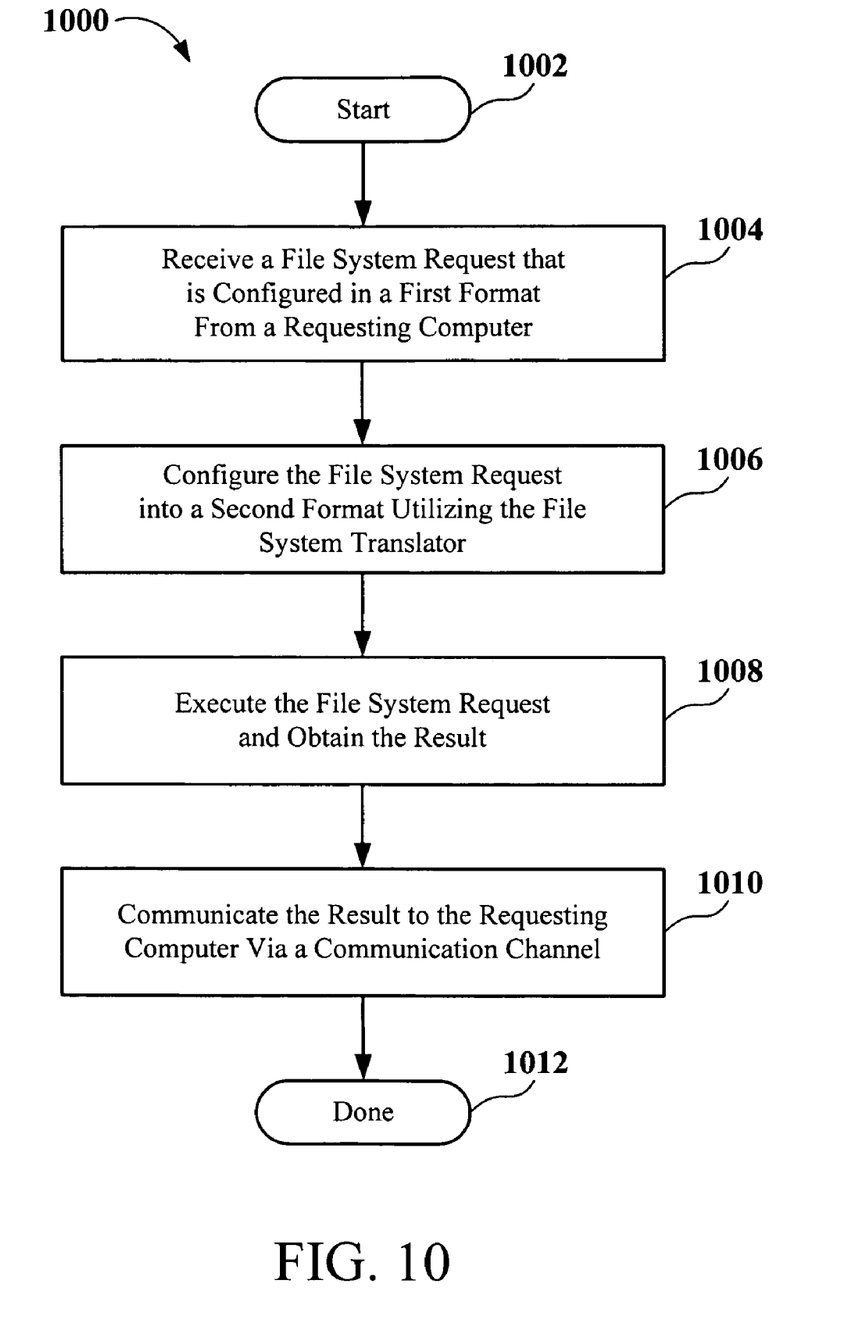
FIG. 10 is a flowchart showing a method for providing independent storage using an independent storage node, in accordance with an embodiment of the present invention.

FIG. 10 is a flowchart showing a method 1000 for providing independent storage using an independent storage node, in accordance with an embodiment of the present invention. The method 1000 illustrates the operation of a typical independent storage node. In an initial operation 1002, preprocess operations are performed. Preprocess operations include generating a file system request, transmitting the file system request, and other preprocess operations that will be apparent to those skilled in the art.

In a receiving operation 1004, the file system request is received from a requesting computer. Typically, the file system request is in a file system format specific to the requesting computer. In a translation operation 1006, the file system translator configures the file system request into a second format based on the O/S executing on the independent storage node. For example, the file system translator could configure the file system request into a second format based on a flat file system and provide the translated file system request to a dynamic flat file system executing on the independent storage node.

The translated file system request is then executed, in operation 1008. Having translated and provided the file system request to the file system operating on the independent storage node, the file system provides the request the device driver. The device driver converts the translated file system request into a block-level I/O request that is then passed from the I/O device to perform the request in conjunction with the storage device. Results of the performance of the file system request are then obtained and transmitted back to the requesting computer in a communication operation 1010.

Data is transferred per the request and the results obtained from performing the file system request are communicated to the requesting computer using a communication channel, in a communication operation 1010. As previously discussed, the communication channel uses driver-to-driver communication semantics and is a logical connection that is independent of the underlying physical transport and the transports low-level protocols. The communication channel abstracts the transport driver and transport hardware, and thus presents the independent storage driver and file system translator with a logical direct communication link between the two.

Further, the communication channel is hidden from upper level applications using the independent storage driver, such that the upper level applications are unaware of the communication channel specifics. As discussed above, the communication channel may completely reside on a single machine. It should be noted that the upper level applications interact with the storage device in essentially the same manner, whether the storage device is local or remote, since embodiments of the present invention make the storage device appear local to upper level applications.

Post process operations are then performed in operation 1012. Post process operations include communication channel maintenance and other post process operations that will be apparent to those skilled in the art. Advantageously, embodiments of the present invention provide platform independent storage for consumer computers, regardless of underlying hardware, operating system, or physical transport.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for software module to module communication, comprising:
   a module interface capable of receiving a file system request configured in either of multiple file system formats, the module interface defined to translate the received file system request into a dynamic flat file system request;
   a first software module in communication with the module interface, the first software module capable of communicating file system requests configured in a first file system format to the module interface; and
   a second software module in communication with the module interface, the second software module capable of communicating file system requests configured in a second file system format to the module interface,
   wherein the first software module is capable of communicating with the second software module via translation through the dynamic flat file system as provided by the module interface.

2. The system of claim 1, wherein the dynamic flat file system is defined as an array of objects including volume-type objects, file-type objects, and directory-type objects.

3. The system of claim 1, wherein the dynamic flat file system is defined to incorporate object attributes from a superset of object attributes, the superset of object attributes including object attributes of the multiple file system formats.

4. The system of claim 3, wherein the module interface includes a file system translator for translating the received file system request into the dynamic flat file system, the file system translator being defined to combine a parsing and generation function with an ability to create file structures from the superset of object attributes of the dynamic flat file system.

5. The system of claim 1, wherein the dynamic flat file system of the module interface provides data storage for both the first and second software modules.

6. The system of claim 1, wherein the first software module operates within a first computing system and the second software module operates within a second computing system, the first and second computing systems being independent from each another.

7. The system of claim 1, wherein the first computing system differs from the second computing system with respect to hardware, operating system, or both hardware and operating system.

8. An independent storage node, comprising:
   a network interface module defined to receive and send data over a network;
   a file system translator defined to receive file system requests from the network interface and translate the file system requests into a dynamic flat file system format;
   a dynamic flat file system defined to direct storage of data received through the network interface module in accordance with the file system requests as translated by the file system translator into the dynamic flat file system format;
   a storage device driver defined to generate block-level requests based on the file system requests in the dynamic flat file system format; and
   a storage device defined to store data in accordance with the block-level requests generated by the storage device driver.

9. The independent storage node of claim 8, wherein the dynamic flat file system is defined as an array of objects including volume-type objects, file-type objects, and directory-type objects.

10. The independent storage node of claim 8, wherein the dynamic flat file system is defined to incorporate object attributes from a superset of object attributes, the superset of object attributes including object attributes of file systems associated with the file system requests received by the file system translator.

11. The independent storage node of claim 10, wherein the file system translator is defined to combine a parsing and generation function with an ability to create file structures from the superset of object attributes of the dynamic flat file system.

* * * * *